United States Patent [19]

Paly et al.

[11] Patent Number: 4,677,564
[45] Date of Patent: Jun. 30, 1987

[54] METHOD FOR THE AUTOMATIC GRADING AND CUTTING OF ARTICLES SUCH AS GARMENT PIECES

[76] Inventors: René44 rue de Lébisey Paly, 14000 Caen; Jacques Svanda, 7, Rue Notre Dame des Victoires, 75002 Paris, both of France

[21] Appl. No.: 713,856

[22] Filed: Mar. 20, 1985

[30] Foreign Application Priority Data

Mar. 21, 1984 [FR] France .................. 84 04409

[51] Int. Cl.⁴ ............................................. G06F 15/46
[52] U.S. Cl. .................................. 364/468; 364/194; 364/470; 364/475
[58] Field of Search ................... 364/191–194, 364/468, 474–476, 470, 200 MS File, 900 MS File; 318/162, 568, 578; 33/17 R, 17 A, 11–12, 14–16

[56] References Cited

U.S. PATENT DOCUMENTS

| | | | |
|---|---|---|---|
| 3,391,392 | 7/1968 | Doyle | 364/200 X |
| 3,766,528 | 10/1973 | Ichida | 364/900 X |
| 3,887,903 | 6/1975 | Martell | 364/200 X |
| 3,895,358 | 7/1975 | Pearl | 364/900 X |
| 3,909,947 | 10/1975 | Voth et al. | 33/23 G |
| 4,149,246 | 4/1979 | Goldman | 364/200 |
| 4,527,402 | 7/1985 | Swallow et al. | 364/470 X |
| 4,558,420 | 12/1985 | Gerber | 364/476 |

*Primary Examiner*—Gary V. Harkcom
*Attorney, Agent, or Firm*—Hoffman, Wasson & Fallow

[57] ABSTRACT

A method for automatically producing different sizes of a particular garment from a basic pattern, wherein the basic pattern is sampled and digitized and this information is entered into the memory of a computer. A reference measurement value is determined utilizing characteristic points of the basic pattern. This reference measurement value along with data provided in the computer relating to evolutions in width and in length of the different sizes are used to calculate reference measurement values for each size. This value along with the characteristic points of the basic pattern are used to produce a pattern of differing size from the basic pattern.

8 Claims, 7 Drawing Figures

METHOD FOR THE AUTOMATIC GRADING AND CUTTING OF ARTICLES SUCH AS GARMENT PIECES

BACKGROUND OF THE INVENTION

The present invention relates to a method for the automatic grading and cutting of articles, such as garment pieces, of different sizes corresponding to a predetermined scale of sizes and having size proportions similar to those of a predetermined basic model pattern.

Grading is the operation which consists in obtaining different sizes, either larger or smaller, in relation to a pre-established scale, of sizes, starting from a basic model pattern produced for a basic size, in order to constitute a family of articles of two or three sizes, which are all different but remain similar in design to the basic pattern.

Grading operations are necessary in all those fields where lines of articles of different sizes which have to correspond to a basic pattern, are produced, but grading becomes more difficult in the case of articles required to adapt to the human body, since the volume of such articles has to evolve according to more or less complex scales of sizes, taking into account the actual evolution of the morphology of the human body. This is the case with the production of garments or with the production of related fields such as lingerie, haberdashery, or the hat, shoes, or even leather good industries.

Garments are generally produced by the assembling together of different pieces, each one of which is cut from a basic pattern or model, which is in the form of a plane developed surface with a particular outline, with in certain cases, additional markings inside said outline.

For every piece of garment, the grading operation consists in defining, from the basic pattern corresponding to a basic size, other patterns similar to the basic one, but adapted for the different sizes, in order to allow subsequent cutting of the pieces for the different sizes, from the material which will constitute the garment, namely fabrics, leather or any other selected synthetic or natural material.

It is already known to mark out on the basic pattern, characteristic points, also called outline points, permitting to reconstitute the whole of the image of the pattern with, if necessary, other markings inside thereof. Grading then essentially consists, for each different size, in determining the characteristic points corresponding to the characteristic points of the basic pattern, wherefrom the image of the basic pattern of the considered size, can be automatically drawn, this in itself further permitting an automatic cutting. The determination from the basic pattern of the various characteristic points for the various sizes, still remains a manual operation, which is long and difficult and necessitates a specially trained staff. It may also happen that after a manual grading of this kind, all the patterns taken from the basic pattern, have to be altered. In the case of semi-automatic methods of grading and cutting, in which the garment pieces are directly cut from the images taken from the basic pattern, without patterns being really made for other sizes but the basic size, the necessity of having to make a test series causes not only a waste of time, but also a waste of material.

SUMMARY OF THE INVENTION

It is precisely the object of the present invention to overcome the aforesaid drawbacks by proposing the automatic cutting of articles for different sizes of a scale of sizes, starting from a basic pattern which is the sole element to be hand-produced.

This object is reached, according to the invention, with a method which consists in entering data in a memory, said data representing, according to a predetermined scale, the evolutions in width and in length of different sizes of the scale, in sampling and digitizing the basic image of a basic pattern, and in storing in a memory digital data representing the basic image of said basic pattern, in determining a reference measurement located on an axis defined by two points geometrically characteristic of the predetermined basic pattern, in storing in a memory a predetermined value of reference measurement for the basic size of the basic pattern, in determining, by means of a computer, the values of the reference measurements which correspond to the different selected sizes, as a function of the stored data representing the evolutions of the different sizes and of the stored value of the reference measurement for the basic size, and the characteristic of the images of the articles of different sizes corresponding to the basic pattern, from the values of the reference measurements of the different sizes selected, and of the stored digital data representing the basic image of the pattern, and in automatically cutting the articles of different sizes according to the characteristics of the predetermined images.

The method according to the invention is very flexible and can be easily performed.

According to a particular feature of the invention, when storing in the memory the digital data representing the basic image of the basic pattern, corrected fixed points are identified, the position of which is predetermined and remains fixed with respect to other characteristic points of the image, whatever the size considered, and when determining the images of the articles of different sizes, corrections are made to keep predetermined distances between the fixed points and the characteristic points of the image of variable position as a function of the reference measurement.

According to another special feature of the invention, when storing in the memory digital data representing the basic image of the basic pattern, corrected points of variable but predetermined localization are identified, their position being predetermined and varying with respect to other characteristic points of the image according to a particular recorded law of variation, as a function of the selected size, and when determining the images of articles of different sizes, corrections are made in order to preserve predetermined distances as a function of the said particular variation law between said corrected points of variable position and the characteristic points of the image of position varying as a function of the reference measurement.

The law of particular variation of the corrected points of variable localization is recorded when the data representing the evolutions in width and in length of the different sizes of the scale, are introduced in the memory.

The use of specific corrections with respect to simple enlargement or reduction by homothetic transformation allows to take into account the particular tensions linked to the morphology of the human body or to the technique used for producing the articles.

But in general, for each size considered, the calculated reference measurement is determined by the quotient of the reference measurement, corresponding to the basic size, by the value of a recorded parameter relative to the evolution of the sizes corresponding to the basic size, said quotient being itself multiplied by the value of the recorded parameter relative to the evolution of the sizes corresponding to the considered size.

Moreover, for all the elementary pieces composing one article or garment, the same value of basic reference measurement is affected to each piece of the basic pattern. This enables the quick and easy production of all the pieces of one garment, such as for example, the back, the front panels, the collar, the sleeves, while making sure that the different pieces are well matched and evolve correctly inasmuch as the evolution of the reference measurement value as a function of the sizes has been correctly calculated in relation to a basic scale.

Moreover, the method according to the invention may be simplified if, in order to determine the characteristics of the images of the different sizes corresponding to the basic pattern, the coordinates of a set of geometrically characteristic points are calculated at first and, intermediate points situated between the adjacent characteristic points are then determined by interpolation according to predetermined laws of variations, established from the basic pattern.

BRIEF DESCRIPTION OF THE DRAWINGS

The invention will be more readily understood on reading the following description with reference to the accompanying drawings in which.

DETAILED DESCRIPTION OF THE PREFERRED EMBODIMENT

Figure 1:
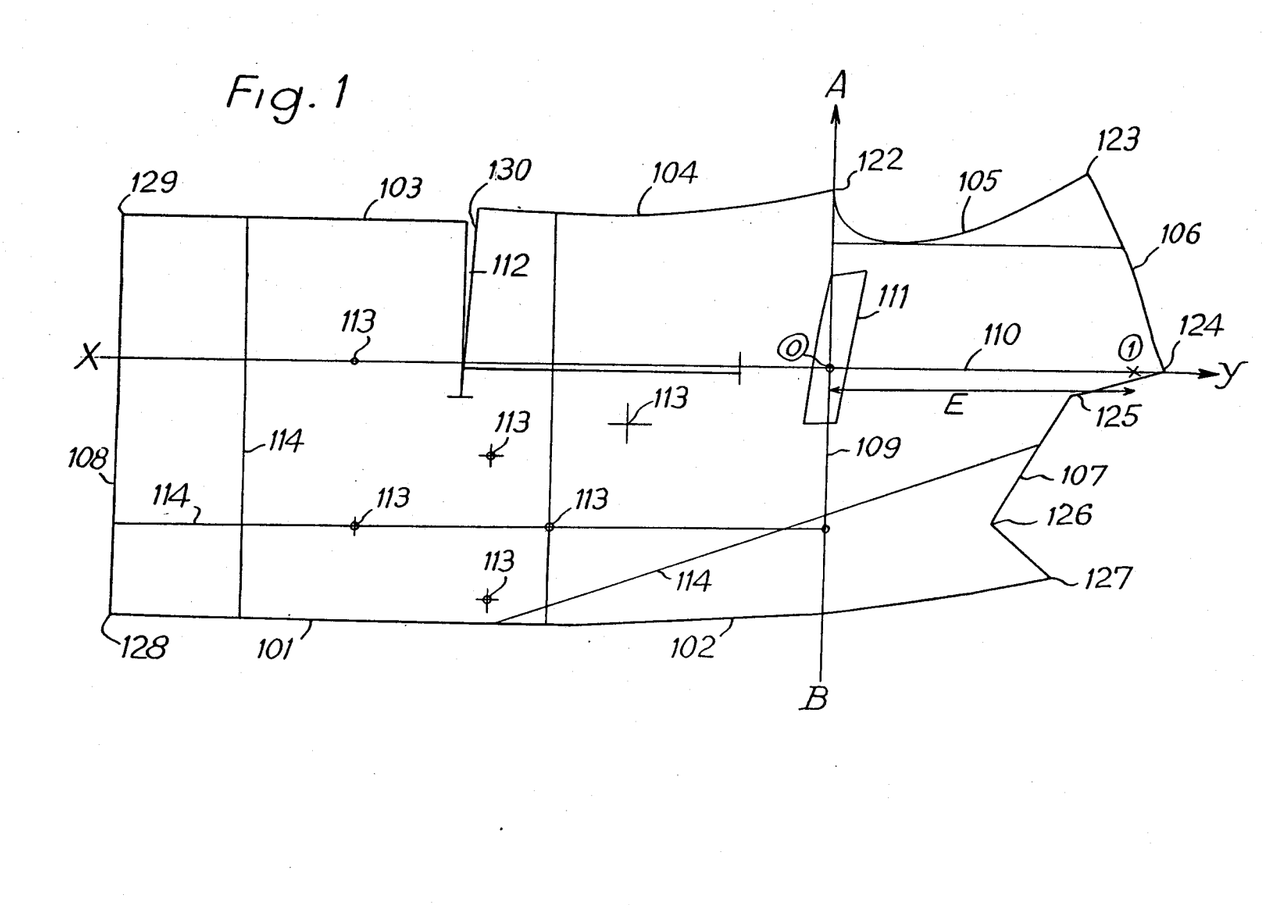
FIG. 1 shows one example of a basic model or pattern constituted by a front panel of a man's jacket.

Referring first to FIG. 1, this shows a basic pattern worked out for the front panel of a man's jacket. Said basic pattern is defined by an outline comprising front edge lines 101, 102, necklines 107, a shoulder line 106, an armhole line 105, side lines 103, 104 and a bottom line 108. The outline is defined by characteristic points 122 to 130 between which the outline evolves regularly, either in rectilinear manner, or according to a predetermined curve. Various inside lines 111, 112, 114 or inside points 113 are also marked on the basic pattern. Said inside lines or points characterize certain peculiarities of the garment such as the presence of pockets, buttons, notches, pleats, darts or seams. Two axes AB and XY are furthermore drawn along lines 109 and 110. Line 109 corresponds to the armhole depth line whereas line 110 joins the shoulder point of the neckline 124 to the armhole depth line 109, perpendicularly to the latter. The two rectangular axes AB, XY enable to work out a reference measurement E between points 0 and 1 as will be explained hereinafter.

For every article or group of articles requiring a grading operation, it is indeed important to define on the basic pattern, and for every piece of said pattern, a reference measurement E which can be determined on an axis such as XY defined by two geometrically characteristic points of the considered piece of the basic pattern. For example, in FIG. 1, axis XY is defined by the shoulderpoint of the neckline 124 and a point of origin constituted by the intersection of the armhole depth line 109 with the perpendicular traversing the point 124 and drawn with respect to line 109.

Figure 2:
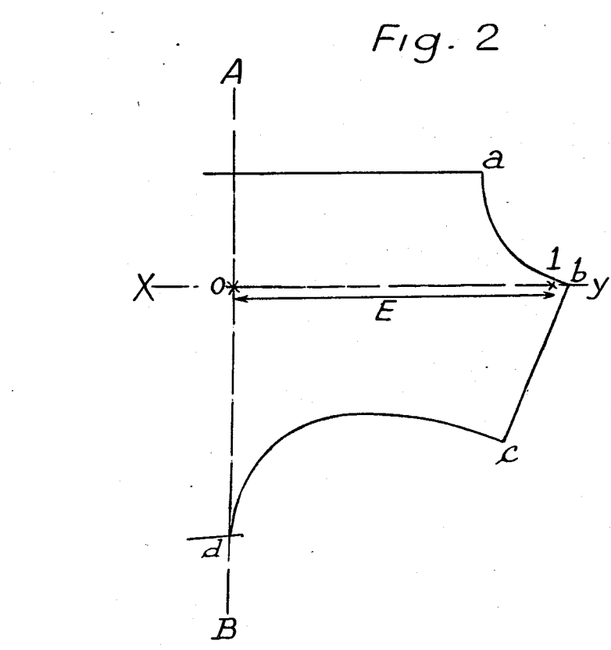
FIGS. 2 and 3 are partial diagrammatical views of, respectively, a pattern of a front panel and a pattern of a half-back showing how a reference measurement is determined.
Figure 3:
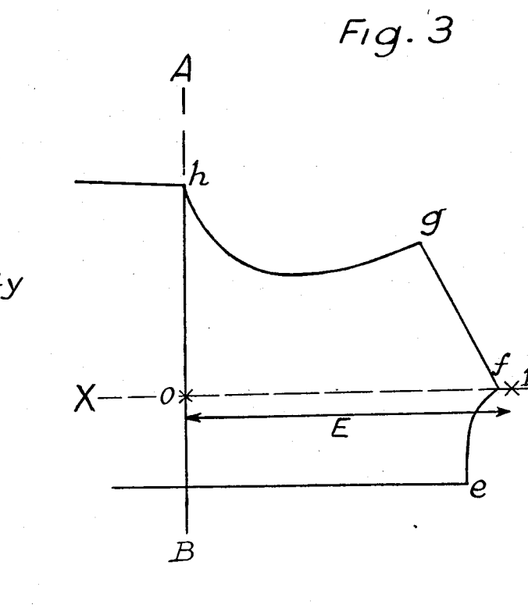

In the case of FIG. 1, the value of reference measurement E could be determined by the point of origin O and by the characteristic point 124. For example, FIGS. 2 and 3 show respectively a piece from one basic pattern constituting a front panel and a piece from a basic panel constituting a back panel, the two pieces corresponding to the same garment. In this case, only one reference measuring value E needs to be determined for both components of the same basic pattern comprising two pieces of the same garment. For every one of said basic pieces, the basic reference measurement is determined from the point of origin O constituted by the intersection of the armhole depth line AB and of line XY, perpendicular to the axis AB traversing the shoulderpoint of the neckline b, respectively f. The distance separating the shoulderpoint of the neckline b, respectively f from the point of origin 0 is measured for every piece of the basic pattern of FIGS. 2 and 3 and the value of the reference measurement E may be constituted for example by the average of the two measured values. In this case, the point 1 which determines, with the point of origin 0, the reference measurement E on axis XY does not coincide with the shoulder point of neckline b, respectively f.

In the case where a basic pattern comprises a group of different pieces designed to be joined together to make up a garment, the same value of basic reference measurement will be applied whatever the piece considered. Only the system of axes on which the reference measurement will be found will differ for the different pieces in relation to the different configurations of said pieces.

As already indicated, grading consists in determining the dimensions of an article for different sizes defined by a given scale. Each article size must obviously be defined from the evolution of a parameter of the human body linked to that article. For example, the different sizes of pieces with a bust, such as shirts, blouses or jackets may be determined from the evolution of the bust measurement. For the hip pieces, such as skirts or trousers, the evolution of the different sizes will be defined from the evolution of the hips measurement. For every article of a given type, there is a scale giving in table form, the evolutions of a characteristic parameter as a function of the different sizes.

According to the invention, the grading process may be conducted automatically as long as input data have been defined, namely a scale of sizes, definition of a reference measurement, and a basic pattern of an article to be made.

The shape of the basic pattern may be determined in manner known per se by analyzing an image. The image of the basic pattern such as for example, the image of FIG. 1, is sampled, then the different points of the image marked in a coordinate system are placed in digital form in order to be stored in a memory similarly to the data relative to the size scale to be used, or to the reference measurement determined on the basic pattern. The shape of the basic image, namely the characteristics of the pattern, may comprise a set of points defining an outline as well as special points corresponding to a plotted line inside the pattern. Moreover, the basic image may be defined by a succession of sampling points permitting to restore the outline of a garment or by the combination of a smaller amount of characteristic geometrical points at a distance one from the other with the laws of variation of the outline between characteristic points permitting to define the position of intermediate points closer together between two adjacent characteristic geometrical points.

In a number of cases, certain points from one article remain at a predetermined fixed distance from other characteristic points of the article, regardless of the size. This is the case for example with the turnings designed to be used for hems. Said special fixed points are then identified as such when they are stored in the memory. Some variable points which are meant to evolve according to their own law of variation, as a function of the different sizes, independently of the selected scale, it is also possible to make an identification of said points with their own law of variation, when storing in the memory the data relative to the basic image.

According to the invention, when the location where the reference measurement is to be taken, has been defined on the basic pattern for a given family of articles, then the evolution of the value of said reference measurement is calculated for the different sizes, as a function of the selected scale of sizes. Such calculation must of course be made from the evolution of a parameter of the scale which corresponds to one part of the body of which the morphology is linked to that of the piece on which the reference measurement has been defined. Indeed, for the example illustrated in FIGS. 1 to 3, the evolution of the reference measurement may be defined from the evolution of the chest measurement. Once the value of the chest measurement corresponding to the basic design and the values of the chest measurements for the different sizes are known, the determination of the value of the reference measurement E for the basic pattern enables to obtain by making a simple rule of three, the values of the reference measurement E adapted to the different sizes of the scale of sizes.

Figure 4:
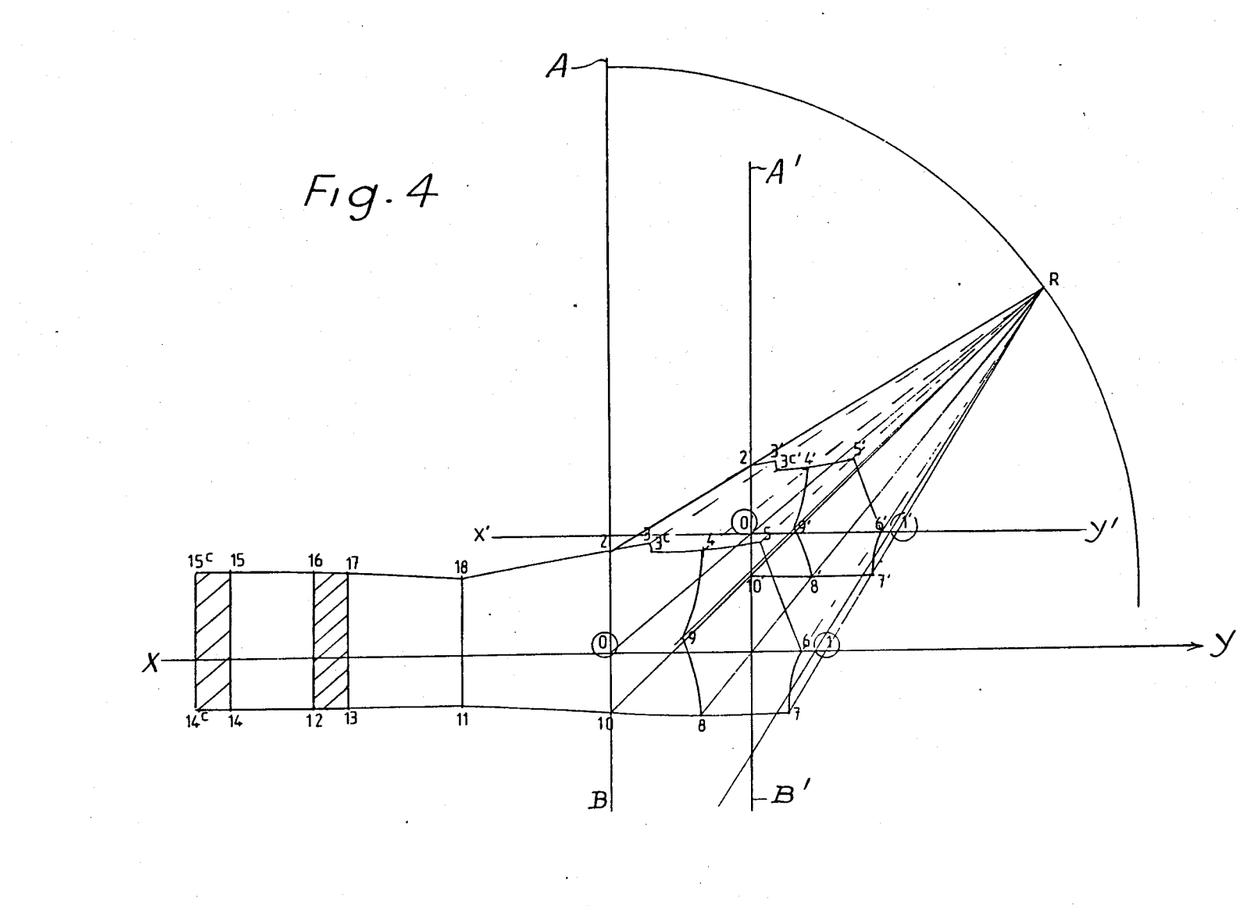
FIGS. 4 to 6 show graphical constructions illustrating the successive steps used to determine a new image from a basic image, taking into account corrections made in the waist length and in the overall length, for a pattern of a half-back panel.

Having determined the values of said reference measurement E for the different sizes, and knowing the shape of the basic image, the shape of the corresponding articles for the different sizes can be determined automatically with a computer, provided that the different shapes are considered at the start as homothetic together, after what they may undergo a series of very specific corrections. For clarity's sake, FIG. 4 shows a graphic method of determining points of a piece of smaller size, from a basic piece defined by points 2 to 18 and of which the reference measurement E is defined by points 0 and 1 positioned on a coordinate system defined by axes AB and XY as indicated hereinabove. The homothetic image of the basic image for a smaller size to which corresponds a reference measurement E' defined by points 0' and 1' limiting a segment of straight line parallel to the segment 01, may be constructed from a point R placed at such a distance from the origin 0 of the first system AB,XY that R is the converging point of straight lines 00' and 11'. Points 2' to 10' of the image to be defined for the smaller size are deduced from points 2 to 10 corresponding by similarity of center R and of ratio 0'1'/01.

In practice, a certain number of corrections are however brought during the determination of the images of articles corresponding to other sizes than the basic size. Said corrections in length or in width are made in order to observe certain technical or morphological obligations and also to take into account the fixed points or the points of predetermined variation. Such corrections may be determined automatically by calculation from complementary scales associated to the basic scale and particularly aimed at following special evolutions specific of certain parts of the human body.

For example, in the case of the pieces illustrated in FIGS. 2 and 3, a correction may be made half on the front armhole and half on the back armhole, this is due to special strains imposed by the evolution of the bust curves for the different sizes.

Thus, for the basic size of the pieces shown in FIGS. 2 and 3, for example, the pattern measurement at the chest level, minus the seams, gives a value of 44 cm. If the chest measurement is, according to the main scale taken, 32 cm for the basic size, it follows that for that same basic size, the chest development is equal to 12 cm.

The basic formula giving the chest development for the different sizes corresponds to the product of the chest development for the basic size and of half the chest measurement of the selected size, divided by half the chest measurement for the basic size.

Yet a number of conditions may be imposed such as the fact that, in case of a chest development, for the basic size, greater than 10 cm, said development is only fully propagated for those sizes below the basic size, whereas for the sizes larger than the basic size, only three quarters of the development obtained for the calculation are propagated. The development of the largest size however, cannot be less than that of the basic size.

In the case where the theoretical calculation made from the chest measurements of the scale of sizes and from the required development, does not correspond to the practical value obtained by calculation from the evolution of the reference measurement, a correction must then be made. Said correction may for example be a few centimetres. The complementary scales taking into account criteria such as that indicated hereinabove enable the accurate definition of the different corrections to be made in particular points.

It is further well known that the lengthwise evolution of human beings differs from the widthwise evolution. If the evolution of the value of the reference measurement as a function of the sizes has really been calculated from a basic scale of sizes, so that the evolution in width is propagated, corrections should then be brought to determine characteristic points defining the length of the garment piece. This is illustrated, by way of example, in FIG. 5 which shows the process used to determine the characteristic points subjected to corrections in length, as a function of an additional correction scale associated with the main scale recorded in the memory.

Figure 5:
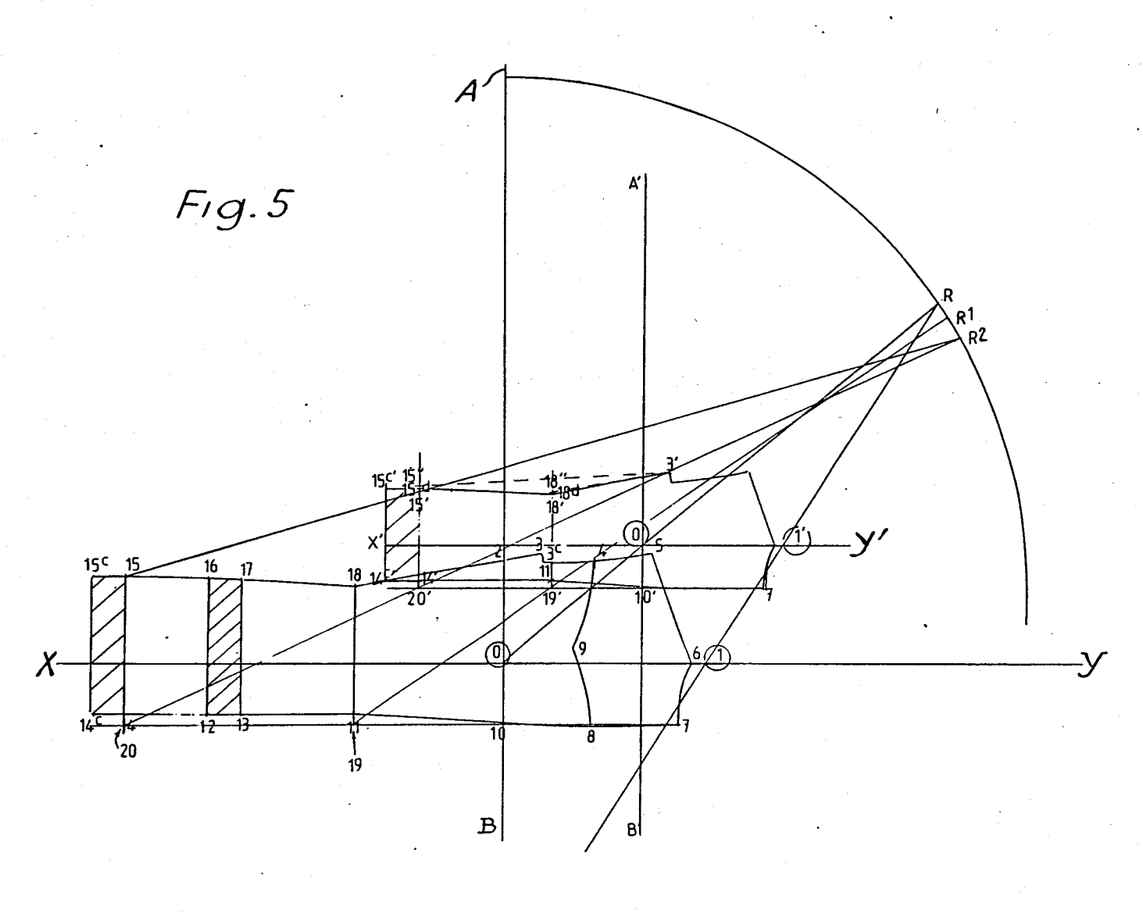

As indicated hereinabove with reference to FIG. 4, the points 2' to 10' of the image similar to the basic image 2 to 18 have been determined by simple similarity from the knowledge of the evolution of the value of the reference measurement E. FIG. 5 shows the determination of points 11', 14' and then 18', 15' corresponding for the new selected size to points 11, 14, 18, 15 of the basic pattern. In the illustrated example, it will be noted that the evolution in length is not as immediate as the evolution in width.

A parallel to axis XY being drawn through the characteristic point 7 situated at the intersection of the neckline with the central edge, the lines of waist length 11-18 and of overall length 14-15 of the basic pattern are extended as far as their intersection in points 19 and 20 respectively, with the parallel to axis XY drawn through point 7. Corresponding points 19' and 20' for the image to be traced of the basic pattern, are determined by plotting on the parallel to axis X'Y' drawn through point 7', of values predetermined for the required size, of a waist length and overall length which constitutes length corrections. Point $R_1$ being defined by the intersection of the straight line traversing points 19 and 19' with the axis of the circle of center 0 traversing point R, the curving-in point 11' in the middle of the back panel for the image to be traced is determined from the curving-in point 11 of the basic pattern by a similarity of center $R_1$ and of ratio equal to the quotient of segment $R_1.19'$ by segment $R_1.19$. The knowledge of point 11 then enables the drawing of the waist length from point 11' to point 14' and the line in the middle of the back panel from point 11' to point 10'.

In like manner, the point 15' concerning the overall length of the image to be traced is determined from point 15 of the basic pattern by similarity of center $R_2$ and of ratio equal to the quotient of segment $R_2.20'$ by segment $R_2.20$, point $R_2$ being defined by the intersection of the straight line traversing points 20, 20' with the arc of circle of center 0 traversing points R and $R_1$.

The object of the preceding graphic constructions are given merely to help comprehension of the method used to work out an image of different size with respect to the basic pattern. In the case of an automatic processing method, the corrections of length or of width applied to certain points, result in actual fact in a modification for said points of the general evolution of the value of the reference measurement, the evolution of a very specific substitution range (waist length, overall length) being substituted to the evolution of the reference measurement, and the center of similarity being correlatively slightly offset.

Figure 6:
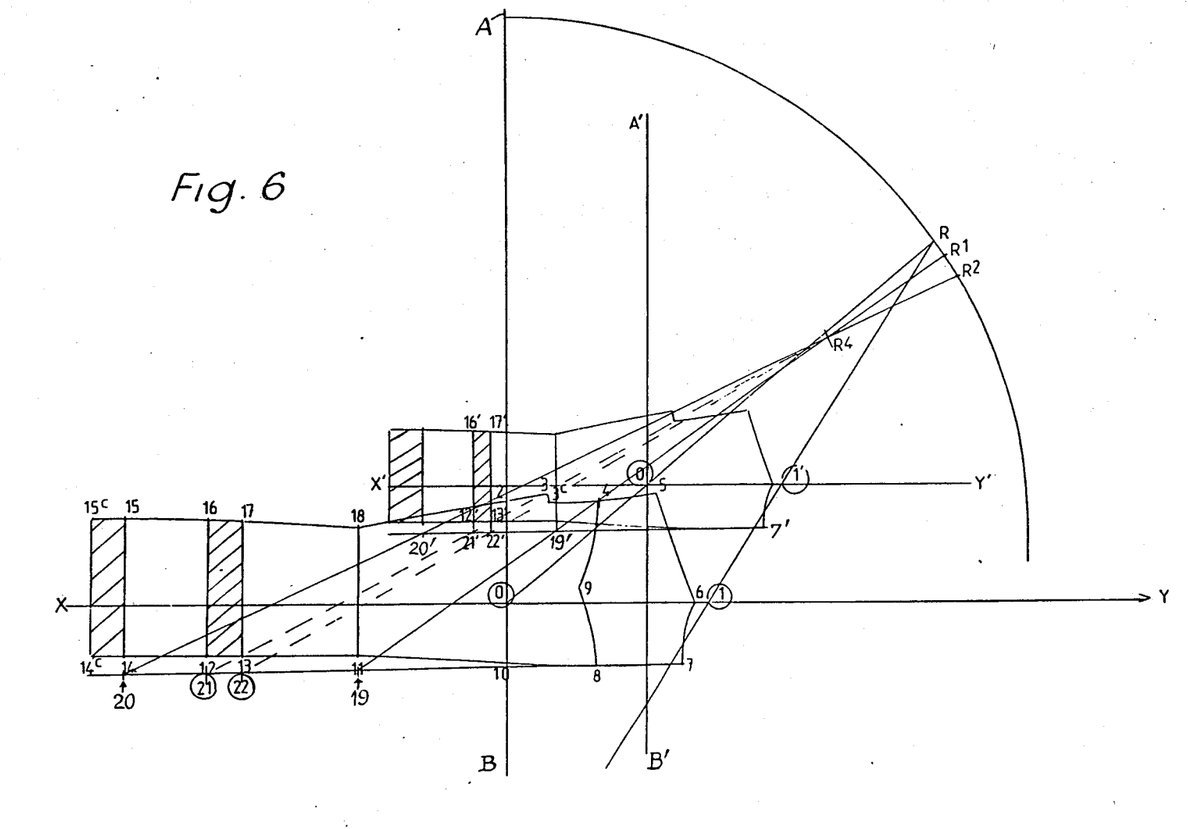

In the case where the image of the basic pattern has to be determined by applying corrections of length or of width, the final position of the corrected points or of points adjacent thereto may be matched with that of the directly determined points, by taking into account the evolution of the value of the reference measurement. This is illustrated in FIGS. 5 and 6 for determining the final points 15d and 18d corresponding to points 15, 18 of the basic image (FIG. 5), and for determining intermediate points 12', 13', 16', 17' corresponding to points 12, 13, 16, 17 respectively, of the basic image (FIG. 6).

The bottom width of the piece to be made up, which is defined by points 15d and 14', is matched with respect to the width of the top part and with respect to the total length of the piece. To this end, a parallel to the straight line defined by points 3 and 15 and drawn through point 3' determines a point 15" on the intersection with the overall length-line traversing point 14'. Final point 15d is situated half-way between points 15' and 15".

The final curving-in point 18d is itself harmonized as a function of points 15d and 3'. To this end, a first point 18' is determined by the intersection of a parallel to the axis A'B' traversing point 11' with a parallel traversing point 15d to the straight line defined by points 15 and 18. A second point 18" is determined by the intersection of a parallel to axis A'B' traversing point 11' with a parallel, traversing point 3', to the straight line defined by points 18 and 3. The final curving-in point 18d is half-way between the points 18' and 18".

The quadrilateral 15.15c.14c.14 of the basic pattern corresponds to a turning to be used for making the hem. Points 15c and 14c as a result correspond to fixed points and should remain at a constant distance from points 15 and 14 or of their images. Thus, points 15c' and 14c' will be determined from points 15d and 14' by simple translation. Moreover, the side line 15c', 15d, 18d, 3' can readily be drawn by interpolation, once the characteristic points 15c', 15d, 18d are determined.

In FIG. 6, points 12, 13, 16, 17 determine a design having the shape of a parallel strip at the bottom of the piece, and which is due to be positioned and dimensioned as a function of points 11, 14, 15 and 18. In other words, the position of points 12, 13 which defines that of points 16 and 17 should be harmonized in relation to the position of points 11 and 14 between which they are situated. To this effect, a similarity is defined, that center $R_4$ of which is constituted by the intersection of straight lines R1-19-19' and R2-R20-20'. If points 21 and 22 designate the intersection of straight lines 12-16 and 13-17, respectively, with the parallel to axis XY traversing point 7, points 21' and 22' are determined by the intersections of straight lines R4-21 and R4-22 with the parallel to axis X'Y' traversing point 7'. Points 12, 13', 16', 17' are then easily determined as indicated in FIG. 6.

Figure 7:
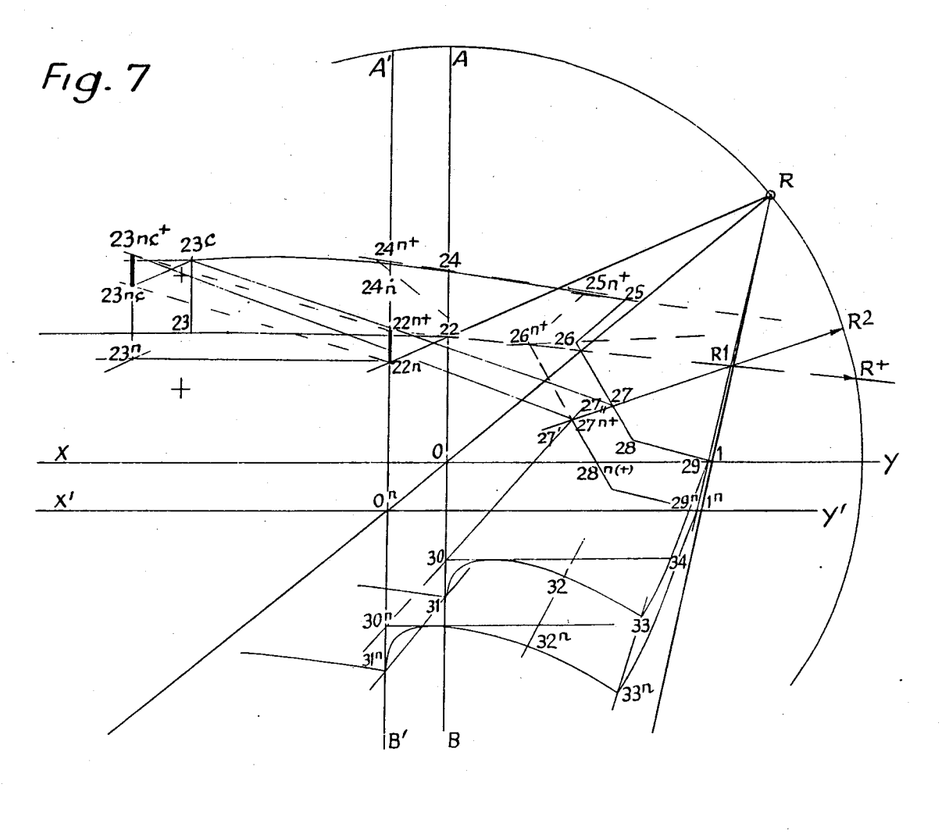
FIG. 7 is a graphical construction illustrating the successive steps used to determine a new image from a basic image, taking into account certain width corrections, for a front panel pattern.

FIG. 7 shows another example of application of the method according to the invention, which with a basic pattern defined by points 22 to 34, consists in determining the shape of a piece of larger size defined by points referenced with numbers having the index n. The segment 0.1 corresponds to the value of the reference measurement for the basic pattern whereas the segment 0n.1n corresponds to the value of the reference measurement for the selected size. Points 22n, 23n, and 29n to 33n, are determined according to the method described hereinabove, namely that they are deduced from corresponding points 22, 23 and 29 to 33 by a similarity of center R and of ratio 0n.1n/0.1, 0n.1n representing the value of the reference measurement of the wanted size and 01 being the value of the basic reference measurement. On the contrary, a correction of, for example, 3cm is applied on the middle line of body defined by points 22 and 23, this corresponding to a correction in width. Points 22n and 23nc therefore respectively become points 22n+ and 23nc+ after application of the correction. Adjacent points corrected by harmonization have been given index n+. The process used for working out the image of the wanted size with application of a width correction is similar to that described with reference to the examples illustrated in FIGS. 4 to 6. Therefore only a few general rules applied in the computing method will be explained hereafter.

Thus, in general, when a point from a geometrical figure undergoes a correction, whether positive or negative, all the other points situated between said corrected point and that in the same figure which has not undergone any correction, are also subjected to a correction proportional to their position with respect to the corrected point. Said correction is therefore all the greater that the point under consideration is closer to the corrected point. In the case of FIG. 7, the positive correction made to points 22n and 23n also entails a correction of points 23nc, 24n to 27n. Point 28n+ will itself be obtained by the intersection of line 26n-27n with the parallel to line 28-29 drawn through point 29n.

It is also found that, seen from a graphical standpoint, to obtain the position of a point depending of two other points, one of which has undergone a correction, while the other has not, it is important to obtain two intersections of the line of projection of said point, one defined by a line starting from the non-corrected point, and the other defined by a line starting from the corrected point. Thus, in FIG. 7, point $27n+$ depends of non-corrected point 29 and of corrected point $22n+$. Said point $27n+$ is situated halfway from points $27'$ and $27''$ obtained, one by drawing line parallel to straight line 27–29 traversing a point $29n$, the other by drawing a line parallel to straight line 22–27 traversing point $22n+$, points $27'$ and $27''$ being on the other hand situated on the radius cutting at point R2, the circle of center 0 traversing point R (FIG. 7).

The application of corrections according to the invention enables to proceed in successive stages, this making an automatic calculation by computer possible. The correction process of successive points as illustrated by way of example in FIG. 7, can however be explained in graphical manner. Thus, for the correction of intermediate points such as points $24n+$, $25n+$, $26n+$, first a new point $R+$ is defined on a circle of center 0 traversing point R. Said point $R+$ is determined by the intersection of a straight line traversing corrected point $22n+$ and the corresponding point 22 of the basic size, with the circle of center 0 traversing point R. The straight line $2A+-22$ cuts through at point $R^1$ the line of projection of non-corrected point $29n$. Point $R^2$ is obtained by the intersection of a straight line traversing point 27 of the basic size and point $R^1$, and of the circle of center 0 traversing point R. Point $R^2$ is then used for projecting points $24n$, $25n$, $26n$ situated between two corrected points.

It will be noted that in the type of piece illustrated in FIG. 7, the distance between points 23 and $23c$ or $23n$ and $23nc$ are constant. Moreover, points $23c$, 24 to 29 and 31 to 33 define an outline whereas point 22 is an internal point corresponding for example to the middle of the front or to the position of a button, and point 31 is also a point of internal construction.

In general, the present invention enables to determine for different sizes, the characteristics of a garment piece, from the knowledge of a basic pattern, without having to search manually for the coordinates of every characteristic point from every size. According to the invention, the adoption of a reference measurement defined for each piece of an article within a coordinate system linked to said piece, enables to perform a rapid grading by immediately obtaining a set of characteristic points for a piece of different size, while authorizing adjustments by successive corrections and harmonization, from preestablished scales. Mostly, the adoption of one value of reference measurement for different pieces of one and the same design of garment, despite different markings of reference measurements in systems particular to each one, guarantees a harmony of the entire garment whatever the size considered. The images of the pieces defined according to the invention can thus be used directly for controlling a cutting table without any risk of waste.

What is claimed is:

1. A method for the automatic grading of articles, such as garment pieces of different size, said method comprising the steps of:
   (a) entering and storing first data in a first memory of a computer representing the evolutions in width and in length of selected sizes of a predetermined scale;
   (b) physically sampling and digitizing second data from a basic pattern and entering and storing said second data in a second memory of such computer, said second data used to form an image of the basic pattern provided with a plurality of characteristic points defining the outline of the basic pattern;
   (c) determining a reference measurement value located on an axis defined by two of said characteristic points of the basic pattern provided by the data in said second memory;
   (d) storing said reference measurement value in a third memory of said computer;
   (e) calculating the reference measurement value of each of the different sizes of the garment pieces from the information provided in said first and third memories, said calculating step conducted in said computer; and
   (f) calculating in said computer the characteristic points of each of the various sizes of the garment utilizing the reference measurement values of each size of the garment determined in step e) as well as the characteristic points of the basic pattern stored in said second memory thereby providing information from which an image outline of the various sizes of the basic pattern which can be produced, said characteristic points of each of the various sizes stored in a fourth memory.

2. The method in accordance with claim 1, wherein for each size considered, the calculated reference measurement is determined by the quotient of the reference measurement, corresponding to the basic size, by the value of a recorded parameter relative to the evolution of the sizes corresponding to the basic size, said quotient being itself multiplied by the value of the recorded parameter relative to the evolution of the sizes corresponding to the considered size.

3. The method in accordance with claim 1 further including the step of automatically cutting the various sizes according to the image outline determined by the calculation of the characteristic points for each size of the garment.

4. The method in accordance with claim 1 further including the steps of:
   (a) inputting digital data into said second memory representing connected fixed points of the image of said basic patterns, the position of each of said fixed points remaining fixed with respect to the characteristic points of each of the different sizes of the garment; and
   (b) correcting the image outline of each of the different sizes provided in said fourth memory by insuring that the distance between each of said fixed point and its related characteristic point remains constant regardless of the size.

5. The method in accordance with claim 1, further including the steps of:
   (a) inputting digital data into said second memory representing connected points of variable but predetermined localization which position varies with respect to particular characteristic points of each of said image outlines according to a particular law of variations inputted into said first memory; and
   (b) correcting the image outline of each of the different sizes to preserve predetermined distances of said image outline as a function of said law of variations between connected points of variable position and said characteristic points of said image outline.

6. The method in accordance with claim 1 wherein a single reference measurement is calculated for one garment consisting of a plurality of elementary pieces.

7. The method in accordance with claim 1 further including the steps of:
   (a) inputting digital data representing a law of variations into said first memory; and
   (b) providing an image outline of each of the different sizes by interpolating a line between the adjacent characteristic points utilizing said law of variations.

8. A method for the automatic grading of articles, such as garment pieces of different size, said method comprising the steps of:
   (a) entering and storing first data in a first memory of a computer representing the evolutions in width and in length of selected sizes of a predetermined scale;
   (b) sampling and digitizing second data from a basic pattern and entering and storing said second data in a second memory of such computer, said second data used to form an image of the basic pattern provided with a plurality of characteristic points defining the outline of the basic pattern;
   (c) determining a reference measurement value located on an axis defined by two of said characteristic points of the basic pattern provided by the data in said second memory;
   (d) storing said reference measurement value in a third memory of said computer;
   (e) calculating the reference measurement value of each of the different sizes of the garment pieces from the information provided in said first and third memories, said calculating step conducted in said computer;
   (f) calculating in said computer the characteristic points of each of the various sizes of the garment utilizing the reference measurement values of each size of the garment determined in step e) as well as the characteristic points of the basic pattern stored in said second memory thereby providing information from which an image outline of the various sizes of the basic pattern which can be produced, said characteristic points of each of the various sizes stored in a fourth memory; and
   (g) automatically cutting the various sizes according to the image outline determined by the calculation of the characteristic points for each size of the garment.

* * * * *